(12) United States Patent
Ariyoshi et al.

(10) Patent No.: US 8,213,327 B2
(45) Date of Patent: Jul. 3, 2012

(54) COMMUNICATION QUALITY MEASUREMENT SYSTEM, DEVICE, MANAGEMENT SERVER AND METHOD THEREOF

(75) Inventors: Hideki Ariyoshi, Kawasaki (JP); Kazuo Mizuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 46 days.

(21) Appl. No.: 12/392,251

(22) Filed: Feb. 25, 2009

(65) Prior Publication Data

US 2009/0213746 A1 Aug. 27, 2009

(30) Foreign Application Priority Data

Feb. 27, 2008 (JP) .................................. 2008-46455

(51) Int. Cl.
*H04L 12/26* (2006.01)
*G06F 15/16* (2006.01)
(52) U.S. Cl. .......................... 370/252; 370/241; 709/224
(58) Field of Classification Search .................. 370/252, 370/241, 248–249, 253; 709/221, 224
See application file for complete search history.

(56) References Cited

U.S. PATENT DOCUMENTS

| | | | | |
|---|---|---|---|---|
| 6,023,455 | A * | 2/2000 | Takahashi | 370/249 |
| 7,197,010 | B1 * | 3/2007 | Berstein et al. | 370/252 |
| 7,496,046 | B2 * | 2/2009 | Kanazawa et al. | 370/252 |
| 7,644,850 | B2 * | 1/2010 | Gerlach et al. | 227/155 |
| 7,664,850 | B2 * | 2/2010 | Lee et al. | 709/224 |
| 7,710,888 | B2 * | 5/2010 | DelRegno et al. | 370/249 |
| 7,894,354 | B2 * | 2/2011 | Grovenburg | 370/252 |
| 7,944,849 | B2 * | 5/2011 | Yamasaki | 370/252 |
| 2002/0055999 | A1 * | 5/2002 | Takeda | 709/224 |
| 2006/0224731 | A1 * | 10/2006 | Haga et al. | 709/224 |
| 2007/0058555 | A1 * | 3/2007 | Blair et al. | 370/250 |
| 2007/0177520 | A1 * | 8/2007 | Morinaga et al. | 370/252 |
| 2007/0223454 | A1 * | 9/2007 | Kimura et al. | 370/352 |
| 2008/0049635 | A1 * | 2/2008 | Huang et al. | 370/252 |

FOREIGN PATENT DOCUMENTS

| | | |
|---|---|---|
| JP | 2003-101583 | 4/2003 |
| JP | 2007-259320 | 10/2007 |

OTHER PUBLICATIONS

Japanese Office Action dated Dec. 8, 2009, from the corresponding Japanese Application.

* cited by examiner

*Primary Examiner* — Kwang B Yao
*Assistant Examiner* — Candal Elpenord
(74) *Attorney, Agent, or Firm* — Katten Muchin Rosenman LLP

(57) ABSTRACT

A management server that includes a signal control unit for controlling a signal for a packet for measuring communication quality, and a signal communication quality measurement unit that measures communication quality of a signal based on a result of signal control by the signal control unit; and a communication quality measurement device includes a payload control unit for controlling payload of packets for communication quality measurement and a payload communication quality measurement unit that measures communication quality of payload based on a result of payload control by payload control unit.

4 Claims, 12 Drawing Sheets

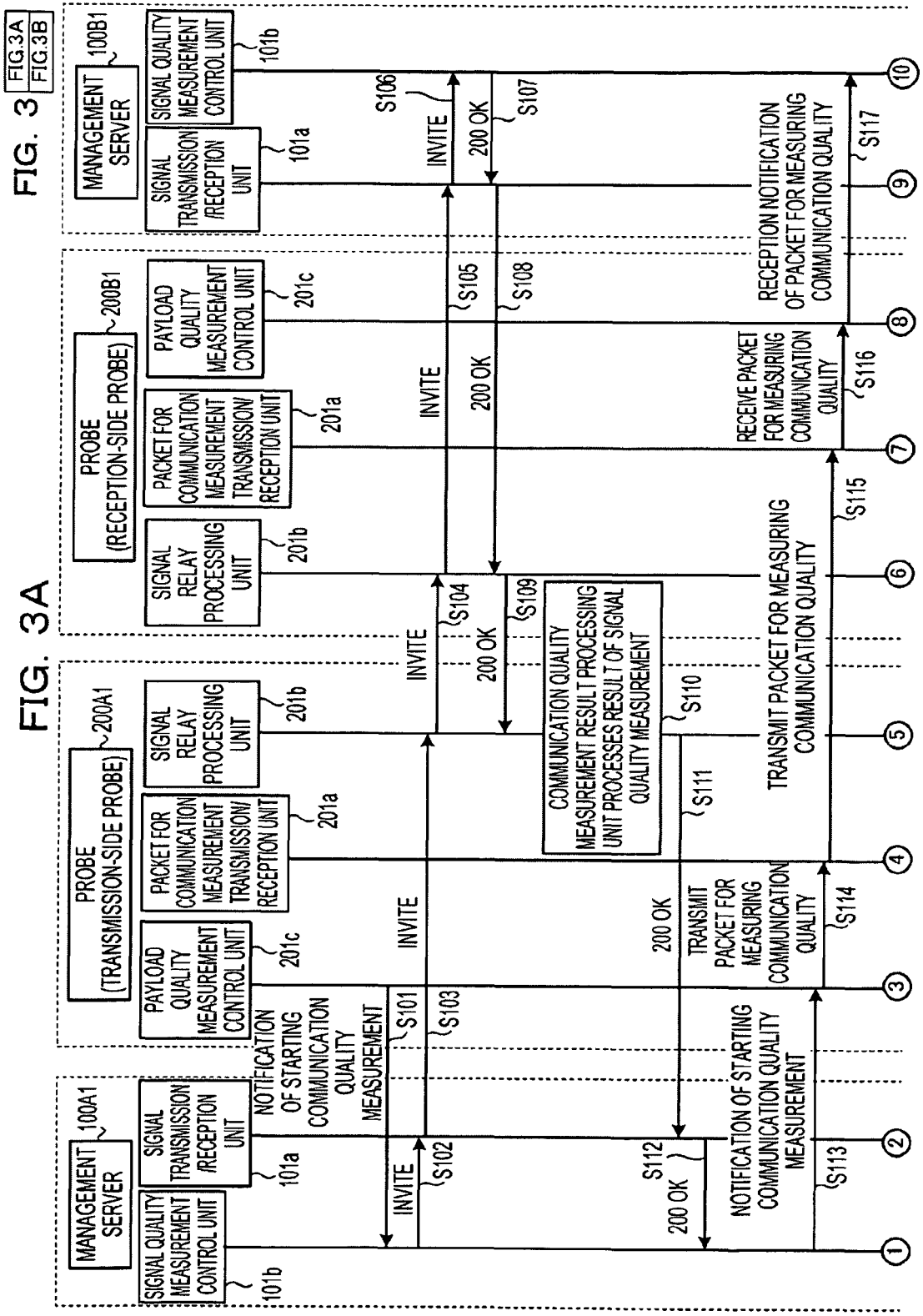

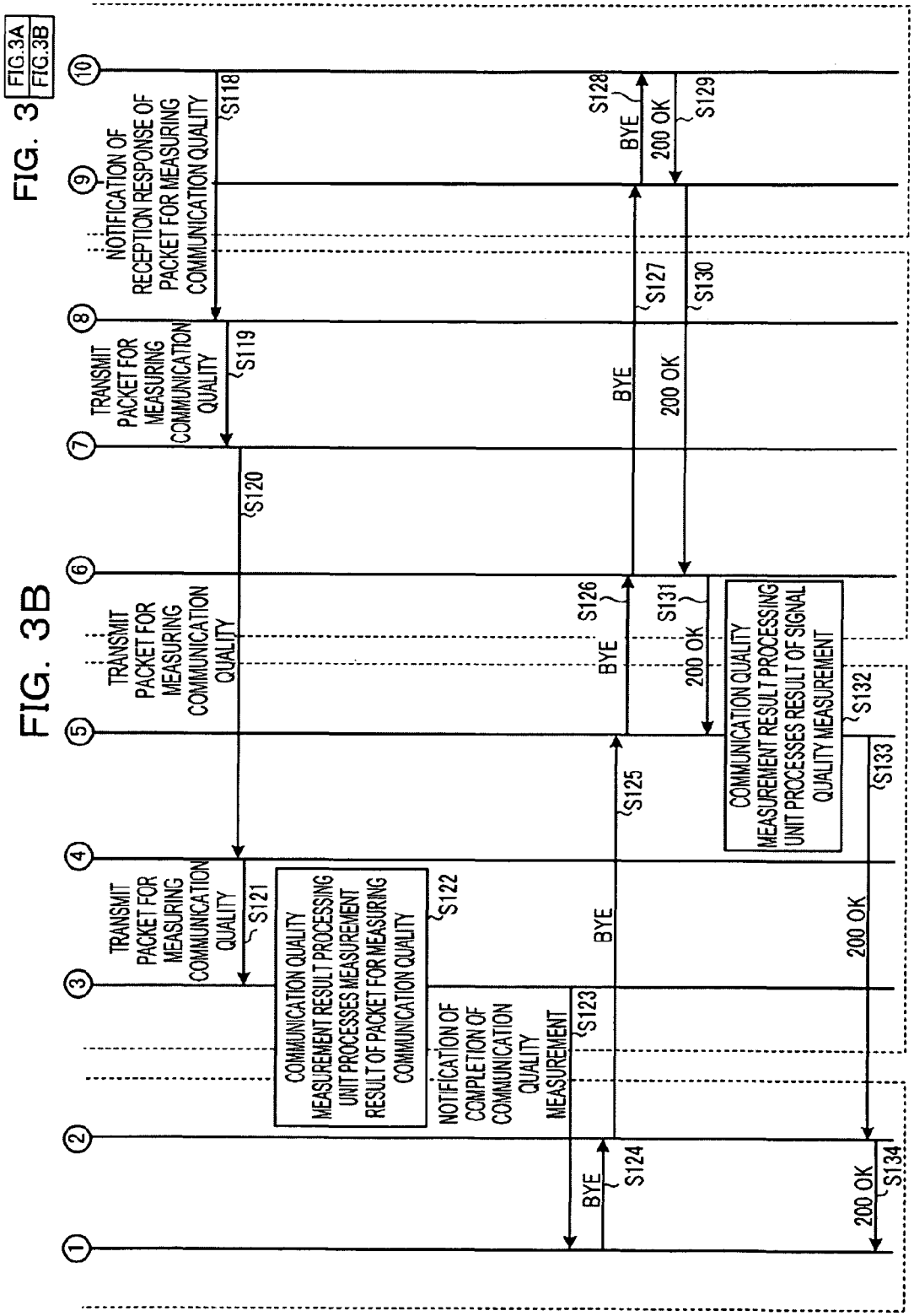

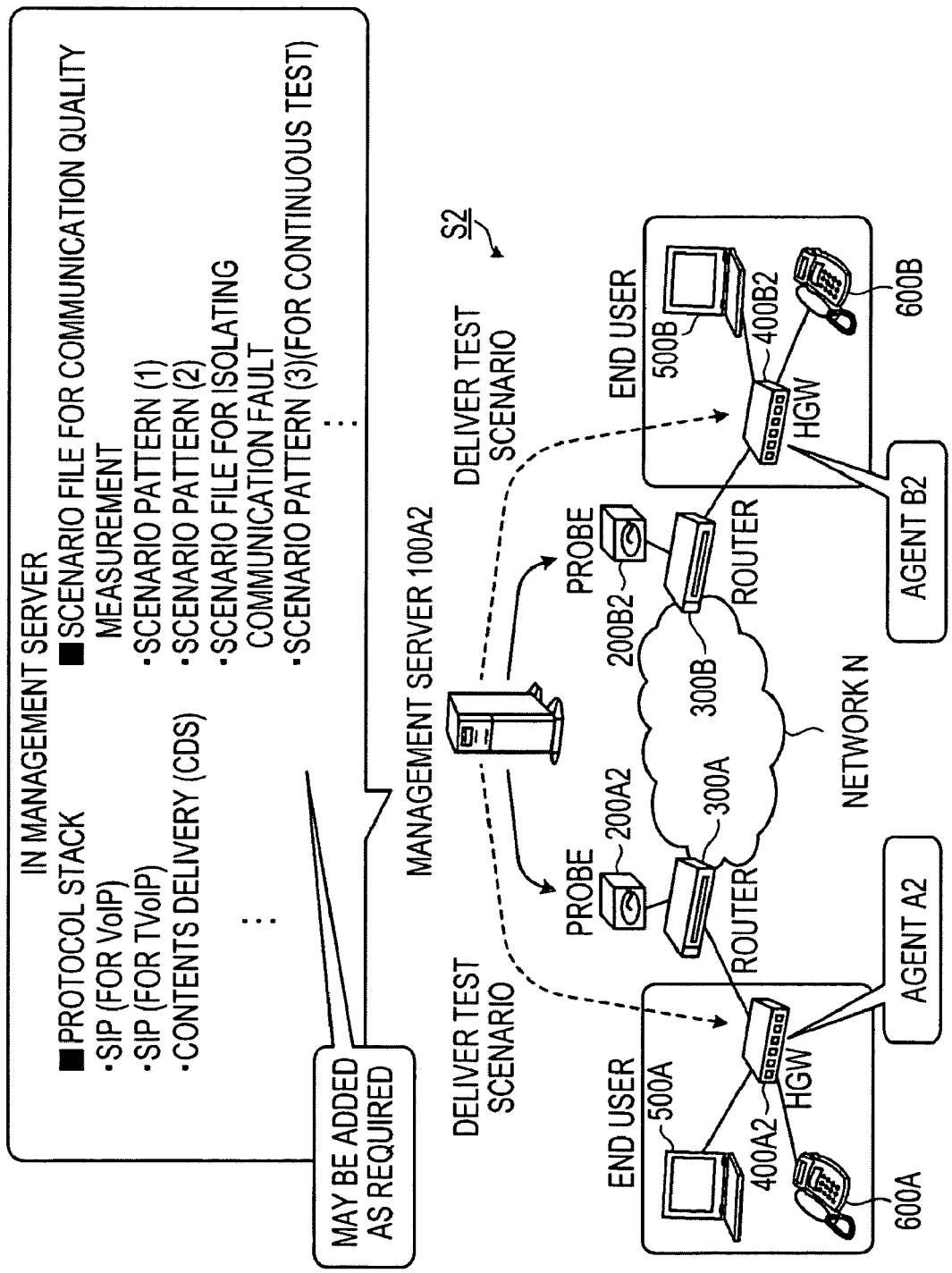

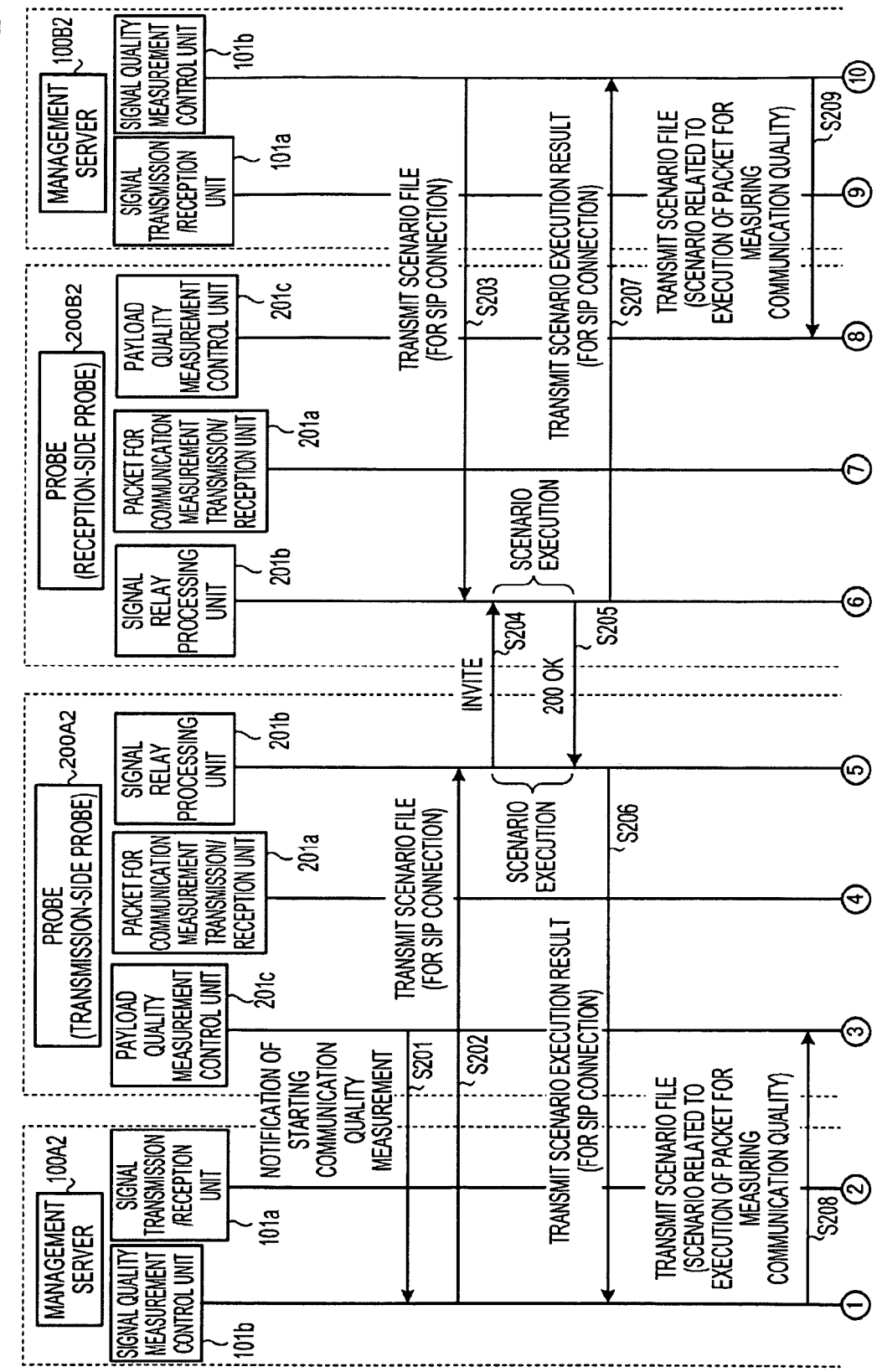

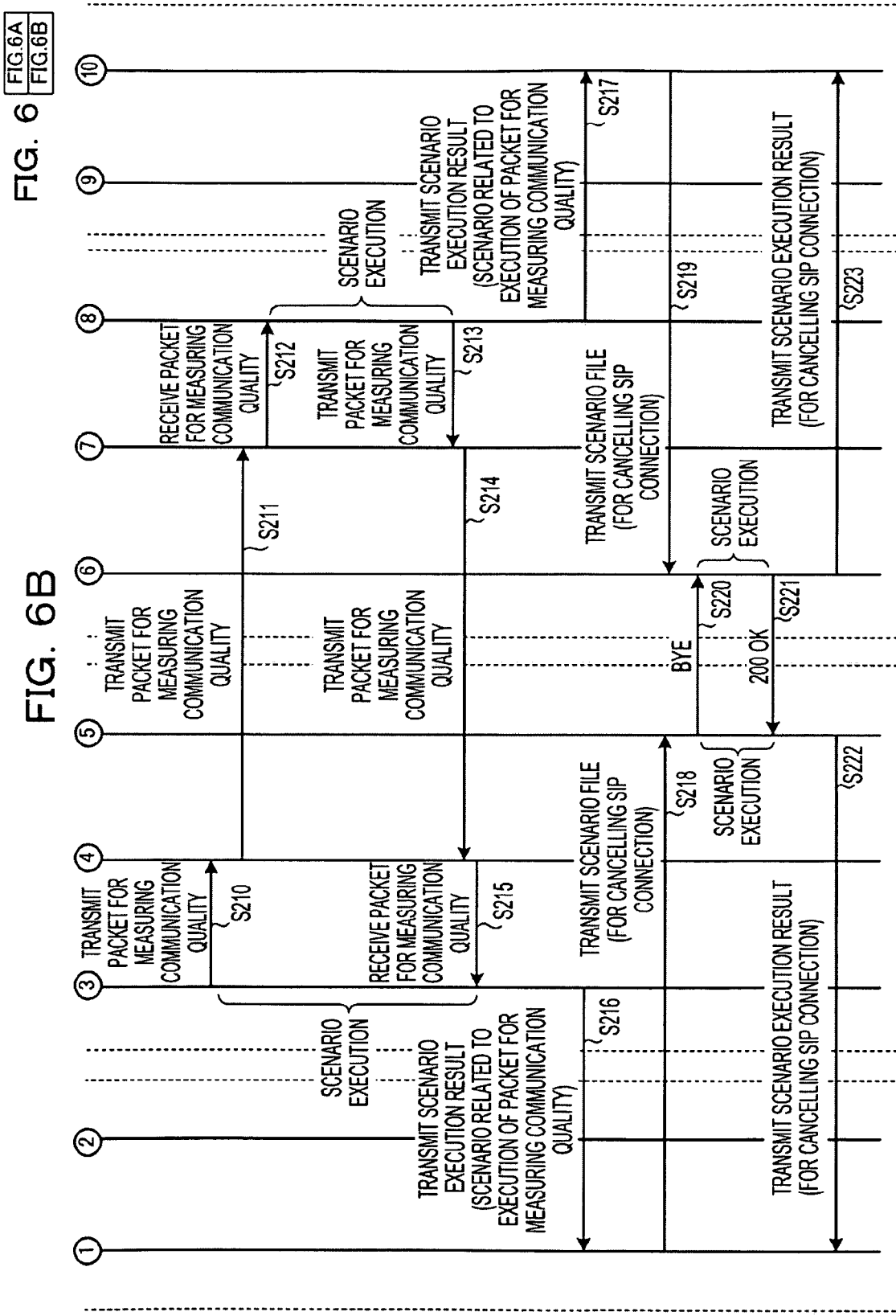

FIG. 7

■ SCENARIO RELATED TO EXECUTION OF PROTOCOL STACK
• TRANSMISSION-SIDE PROBE OR RECEPTION-SIDE PROBE
• INFORMATION ON TRANSMISSION DESTINATION
  (PROBE NAME, IP ADDRESS OF PROBE)
• TRANSMISSION MESSAGE INFORMATION 1
• RESPONSE MESSAGE INFORMATION 1
• TRANSMISSION MESSAGE INFORMATION 2
• RESPONSE MESSAGE INFORMATION 2
• RESPONSE MESSAGE INFORMATION (FINAL)

FIG. 8

■ SCENARIO RELATED TO EXECUTION OF PACKET FOR MEASURING COMMUNICATION QUALITY
- INFORMATION ON TRANSMISSION DESTINATION (PROBE NAME, IP ADDRESS OF PROBE)
- TRANSMISSION-SIDE PROBE OR RECEPTION-SIDE PROBE
- NUMBER OF TRANSMITTING PACKETS FOR MEASURING COMMUNICATION QUALITY
- SIZE OF TRANSMITTING PACKETS FOR MEASURING COMMUNICATION QUALITY
- CODEC TYPE
- TRANSMISSION INTERVAL OF PACKETS FOR MEASURING COMMUNICATION QUALITY

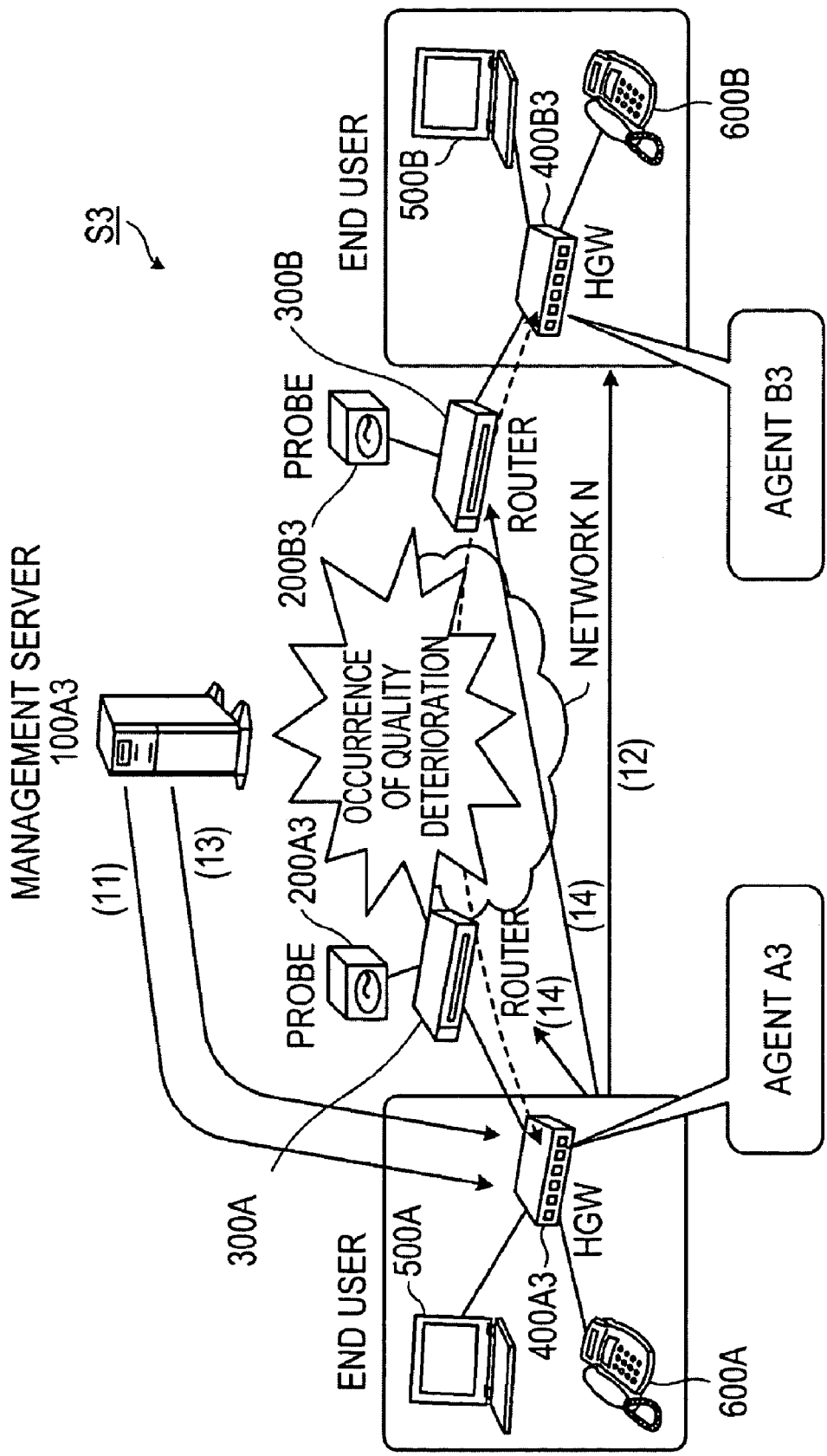

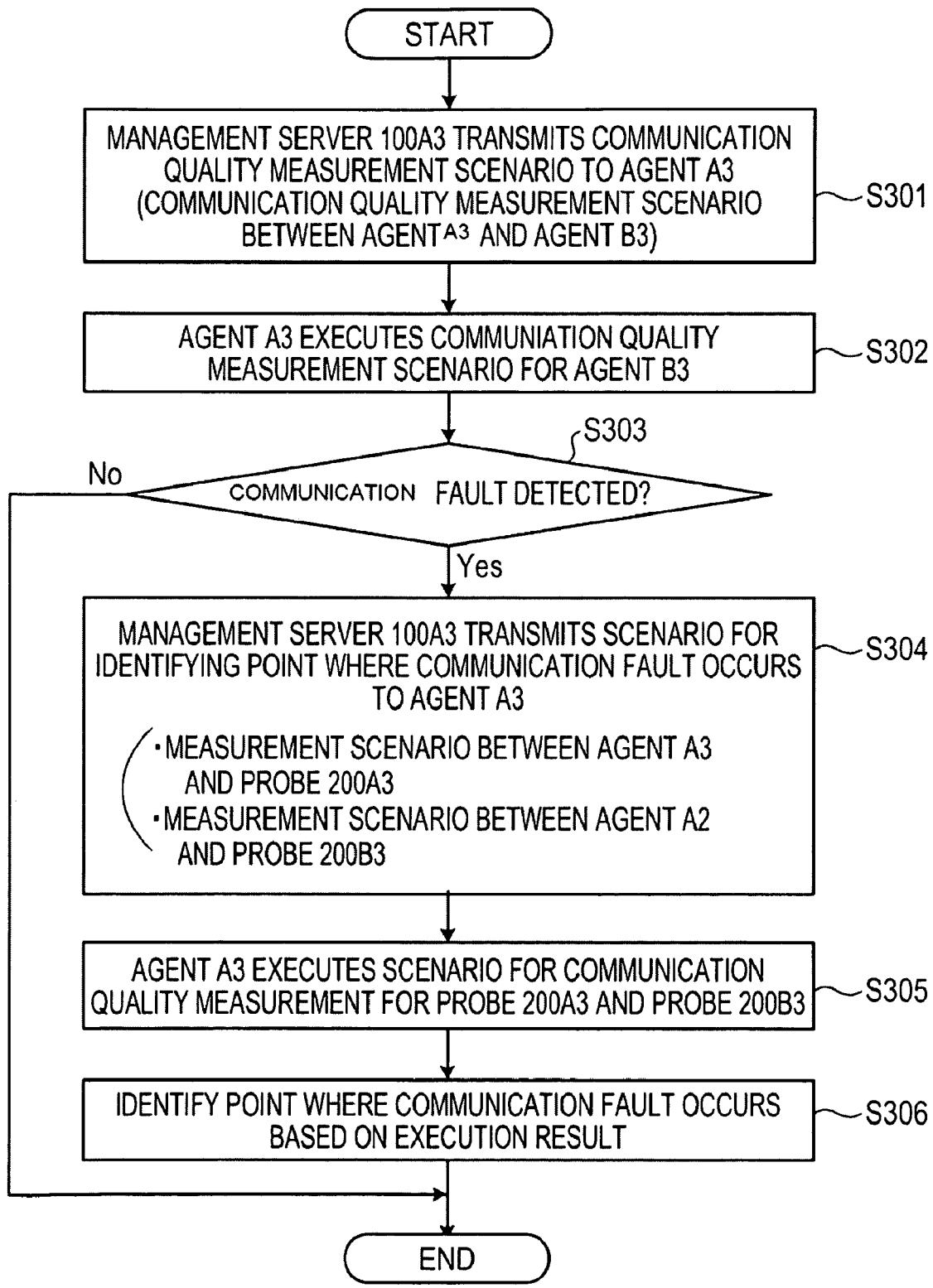

COMMUNICATION QUALITY MEASUREMENT SYSTEM, DEVICE, MANAGEMENT SERVER AND METHOD THEREOF

CROSS-REFERENCE TO RELATED APPLICATIONS

This application is based upon and claims the benefit of priority of the prior Japanese Patent Application No. 2008-46455, filed on Feb. 27, 2008, the entire contents of which are incorporated herein by reference.

FIELD

Certain aspects of the present invention discussed herein are related to a communication quality measurement system that measures communication quality and a method thereof.

BACKGROUND

The present invention relates to a communication quality measurement system, the device, the management server, and the method in which communication quality between opposite communication quality measurement devices in a communication network is measured based on results of transmitting and receiving packets for measuring communication quality between the opposite communication quality measurement devices.

Conventionally, network management of IP (Internet Protocol) network has focused on traffic in data system. Recently, however, amount of traffic, the characteristics, and moreover requirements for an IP network have been changed by emergence of new IP services such as VoIP (Voice over Internet Protocol) and video distribution.

As a result, causes for communication faults in a network have been diversified and the range and the degree of influence by a communication fault vary depending on services, making immediate response to a communication fault increasingly difficult. Under these circumstances, technologies to measure and manage network quality and to identify performance deterioration and a point where communication fault occurs in a large-scale network quickly and in detail have become important in order to overcome these problems of an IP network.

As an example of the conventional technology of the above, a technology is disclosed in Japanese Laid-open Patent Publication No. 2003-101583. The technology reduces amount of information transmitted and received between a network quality evaluation device and a probe manager that manages communication quality based on extracted packet information and thereby reduces effect on traffic due to communication quality management.

However, conventional technologies represented by the above have the following problems. That is a range of IP services have been extending from a core network to an access network, and quality measurement and management for each IP service and quality management at almost End-to-End level have been sought after. More specifically, demand for network and service quality management over diverse access devices, and customer premises equipment have been increasing.

Under these circumstances, a large number of communication quality measurement devices, access devices, and customer premises equipment to which quality management agents are implemented are required to be installed in a wide area. However, installing such large numbers of communication quality measurement devices is not realistic in terms of cost. As a result, management is performed at only a limited number of measurement bases, and it is difficult to identify the precise point where communication fault occurs.

The disclosed communication quality measurement system, communication quality measurement device, management server and communication quality management method are intended to overcome the above drawbacks. The object is to immediately and precisely identify a point where communication fault occurs by measuring communication quality at every measurement basis in a network at low cost.

SUMMARY

A management server that includes a signal control unit for controlling a signal for a packet for measuring communication quality, and a signal communication quality measurement unit that measures communication quality of the signal based on a result of signal control by the signal control unit; and a communication quality measurement device includes a payload control unit for controlling payload of packets for communication quality measurement and a payload communication quality measurement unit that measures communication quality of payload based on a result of payload control by the payload control unit.

BRIEF DESCRIPTION OF DRAWINGS

FIGS. 3A and 3B form a sequence diagram illustrating a processing of a communication quality measurement test of the first embodiment;

FIG. 4 illustrates a communication quality measurement system of a second embodiment;

FIGS. 6A and 6B form a sequence diagram illustrating a processing of a communication quality measurement test of the second embodiment;

FIG. 7 is a diagram illustrating an example of a scenario related to execution of a protocol stack;

FIG. 8 is a diagram illustrating an example of a scenario related to execution of a packet for measuring communication quality;

FIG. 9 illustrates an overview of isolating communication fault at the occurrence in a communication quality measurement system of a third embodiment; and FIG. 10 is a flow chart illustrating isolating communication fault at the occurrence in the third embodiment.

DESCRIPTION OF THE EMBODIMENTS

A communication quality measurement system, the measurement device, the management server and the method according to embodiments of the present invention will be described in detail with reference to the accompanying drawings. In a first embodiment, a second embodiment, and a third embodiment, the communication quality measurement device is called a probe. Network communication quality is measured by transmitting a test packet from a transmitting probe to an opposite receiving probe installed in an IP (Internet Protocol) network.

Network communication quality is measured in terms of two perspectives. One is measuring communication quality of a signal that controls a protocol stack used for transmitting and receiving a test packet, and the other is measuring communication quality of a payload to which user data is stored. Processing of all of communication quality measurement for a test may be performed in a probe where test packets are transmitted and received. This means that the probe executes a protocol stack and analyses a signal, and moreover, transmits and receives test packets that includes payloads, analyses results of transmitting and receiving test packets, and manages the measurement results as well.

Processing load for measuring communication quality of signal is very large, compared to that for payload. Therefore, in order to measure communication quality of a signal, a probe needs to have high processing capacity. As a result, such a probe is expensive, and a configuration of probes has to be complicated.

Generally, large numbers of probes need to be installed in a network to manage communication quality in an IP network in detail. However, places to install probes are naturally limited in the IP network, if a probe is expensive and a configuration of probes is complicated. Thus, it has been difficult to manage communication quality in an IP network in detail. In order to overcome these problems, a first embodiment, a second embodiment, and a third embodiment are proposed.

Figure 1:
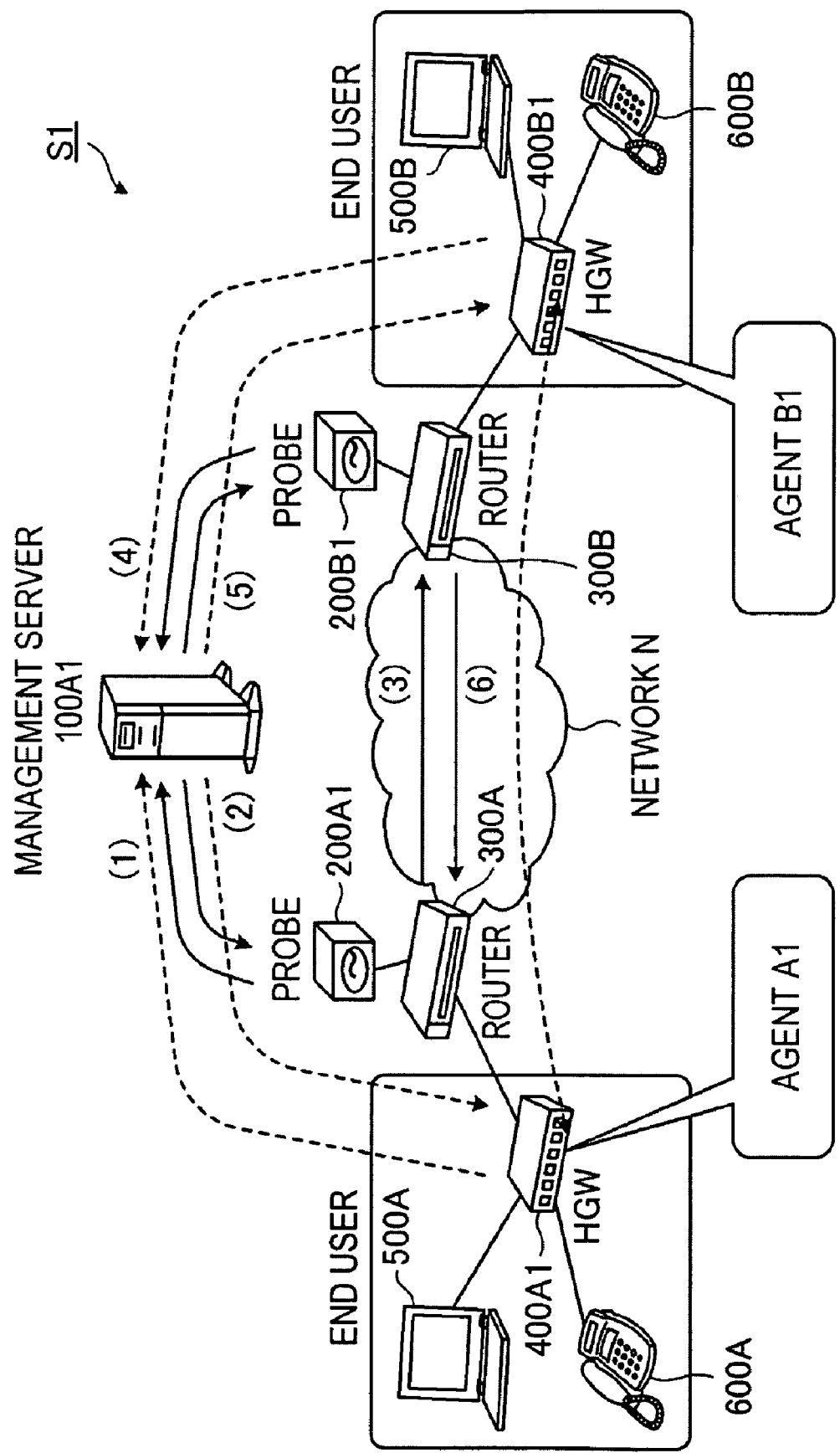
FIG. 1 illustrates a configuration of a communication quality measurement system of an embodiment.
Figure 2:
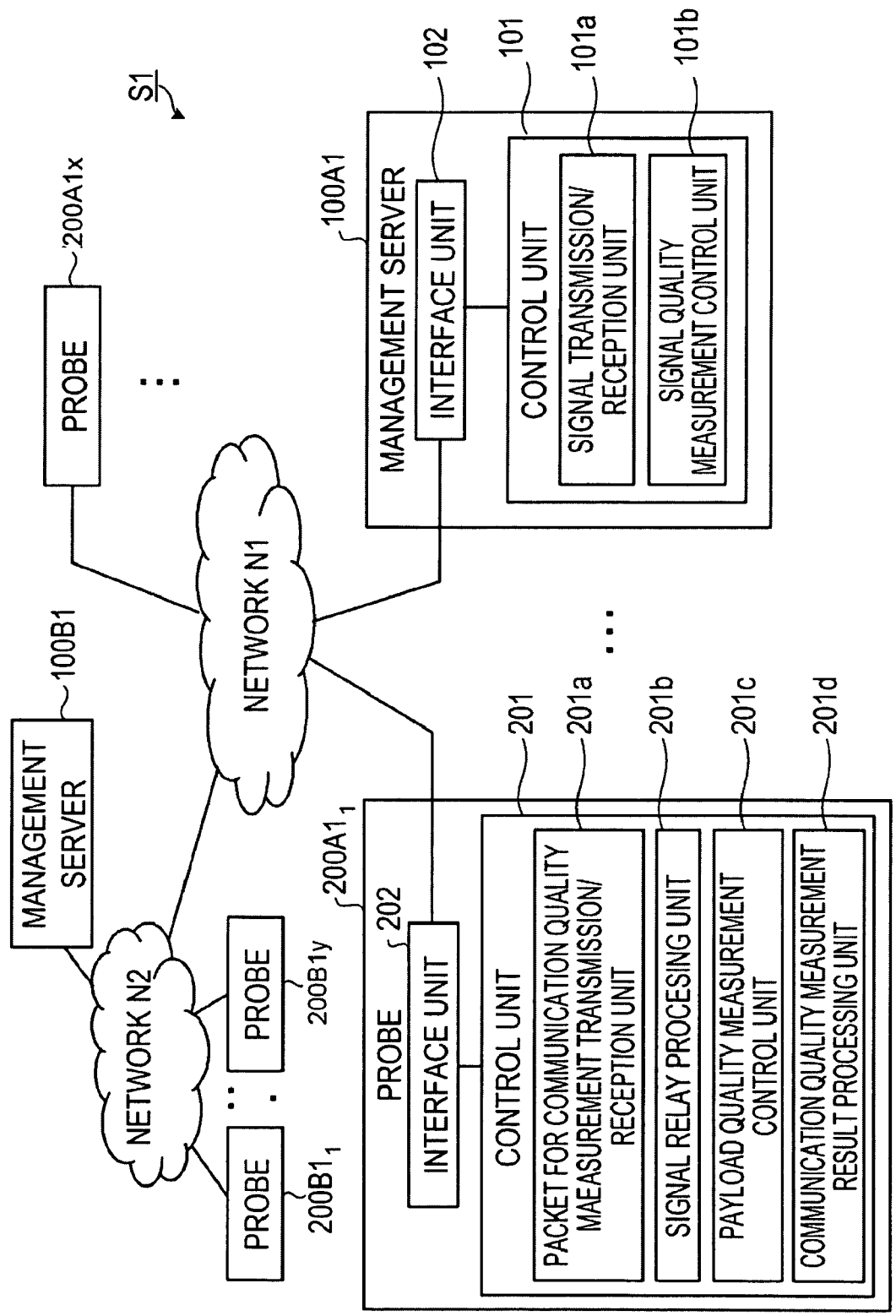
FIG. 2 is a block diagram illustrating a configuration of a communication quality measurement system of a first embodiment.

First, an overview and characteristics of communication quality measurement system of a first embodiment will be described. FIG. 1 illustrates a configuration of communication quality measurement system of the first embodiment. In FIGS. 1 and 2, it is assumed that the system is configured such that one management server 100A1 manages a probe 200A1, a probe 200B1, a HGW (Home Gate Way) 400A1 to which an agent A1 that achieves the functions of probes is implemented, and a HGW 400B1 to which an agent B1 is implemented. However, different management servers 100A1 may manage the probe 200A1, the probe 200B1, the agent A1 of HGW400A1 and the agent B1 of the HGW400B1, respectively.

Now, referring to FIG. 1, in a communication quality measurement system S1 of an embodiment, a management server 100A1 is newly installed. The management server 100A1 executes a protocol stack and analyzes a signal from an opposite probe or an agent. The probe and the agent transmit and receive test packets, and analyze the results of transmit and receive test packets, and manage measurement results.

First, a terminal device 500A and a wired telephone set 600A are connected to the HGW400A1. Secondly, a terminal device 500B and a wired telephone set 600B are connected to the HGW400B1. The above two groups comprise opposite end user terminal groups, respectively.

As an example of execution of a signal, measurement of communication quality between the probe 200A1 and the probe 200B1 will be described. First, (1) the probe 200A1 transmits a test request to the management server 100A1, (2) when the management server 100A1 receives the request from the probe 200A1, the management server 100A1 transmits a signal to the probe 200A1, and (3) the probe 200A1 transmits the signal received from the management server 100A1 to the opposite probe 200B1 via a router 300A.

(4) The probe 200B1 that received the signal from the probe 200A1 via the router 300B transmits the signal to the management server 100A1. (5) The management server 100A1 analyses the received signal and transmits a response signal to the probe 200B1. (6) The probe 200B1 transmits the signal received from the management server 100A1 to the opposite probe 200A1.

In this way, among the processing performed in the probes, execution of a protocol stack and analysis of a signal are performed by the management server 100A1. Thus, the probe 200A1 and the probe 200B1 only relay packets for communication quality measurement, and measure communication quality of payloads. Therefore, such probes do not require high processing capability and simpler configuration is achieved compared to a conventional configuration.

Moreover, a probe may be implemented by installing into an existing communication device, such as an agent with a compact configuration. Processing load of communication quality measurement performed by an agent is low. Therefore, even if a control device of an existing communication device performs the processing; it has little effect on the processing load of the control device.

As described above, probes or agents for measuring communication quality may be installed in a large number of measurement bases in a network. This allows for early detection of communication fault (for example, communication delay, and deterioration of communication quality due to noise contamination) in a network, and immediate and precise identification of a place where communication fault occurs.

Now, a communication quality measurement system of a first embodiment will be described. FIG. 2 is a block diagram illustrating a configuration of a communication quality measurement system of the first embodiment. A communication quality measurement system S1 of the first embodiment is configured by a management server 100A1 connected via a network N1, a probe $200A1_1$, ..., a probe $200A1_x$ (x>1) that are under control of the management server 100A1, and a management server 100B1 connected via a network N2 and a probe $200B1_1$, ..., $200B1_y$ (y>1) that are under control of the management server 100B1.

Note that configurations of the management server 100A1, and the management server 100B1 may be the same, and those of probe $200A1_1$, ..., probe $200A1_x$ (x>1), and probe $200B1_1$, ..., $200B1y$ (y>1) may be the same as well. The network N1 and the network N2 are connected to make one network. Probe $200A1_1$, ..., probe $200A1_x$ may be transmission-side probes, and probe $200B1_1$, ..., $200B1y$ may be reception-side probes, and vice versa.

The management server 100A1 has a control unit 101, and an interface unit 102 for connecting to the network N1. The control unit 101 is a device for controlling an entire management server 100A1 and has a signal transmission/reception unit 101a and a signal quality measurement control unit 101b as a configuration relating to the first embodiment.

The signal transmission/reception unit 101a transmits a signal accompanied with an execution of a protocol stack transferred from a signal quality measurement control unit 101b to a subordinate probe (hereunder called a "transmission-side probe") that transmitted a notification of starting communication quality measurement via the interface unit 102. The signal transmission/reception unit 101a receives a response signal from the opposite probe (hereunder called a "reception-side probe") from the transmission-side probe, and transfers the signal to the signal quality measurement control unit 101b.

The signal transmission/reception unit 101a transmits a response signal to the signal accompanied with an execution of a protocol stack transferred from the signal quality measurement control unit 101b to the reception-side probe via the interface unit 102. Moreover, the signal transmission/reception unit 101a transmits a reception response to a packet for measuring communication quality transferred from the signal quality measurement control unit 101b to the reception-side probe via the interface unit 102.

The signal quality measurement control unit 101b is a control unit that executes a protocol stack and controls a signal relating to execution of a protocol stack. More specifically, when the signal quality measurement control unit 101b receives a notification of starting communication quality measurement from the transmission-side probe, the unit 101b transfers an "INVITE signal" accompanied with starting the execution of the protocol stack to the signal transmission/reception unit 101a.

When a "200OK" signal that is a result of transmission/reception of the "Invite signal" is transferred to the signal quality measurement control unit 101b from the signal transmission/reception unit 101a, the unit 101b transfers a notification of starting communication quality measurement to the transmission-side probe via the signal transmission/reception unit 101a.

The signal transmission/reception unit 101a transfers the "INVITE signal" received from the reception-side probe to the signal quality measurement control unit 101b. The unit 101b transfers the "200OK" signal that is a result of transmission/reception of the "INVITE signal" to the signal transmission/reception unit 101a when the "INVITE signal" is transferred from the unit 101a to the unit 101b.

When the signal quality measurement control unit 101b receives the notification of starting communication quality measurement from the transmission-side probe, the unit 101b transfers a "BYE signal" accompanied with completing execution of the protocol stack to the signal transmission/reception unit 101a. The unit 101a transfers the "200OK" signal that is a result of transmission/reception of the "BYE signal" to the unit 101b.

When the signal quality measurement control unit 101b receives a reception notification of a packet for measuring communication quality transferred from the reception-side probe, the unit 101b transmits a "response notification of reception of a packet for measuring communication quality" that is a result of response to the notification of reception of a packet for communication quality measurement to the reception-side probe. Moreover, the unit 101b transfers a "200OK signal" that is a result of transmission/reception of a signal to the signal transmission/reception unit 101a when the unit 101b receives a "BYE signal" transferred from the unit 101a.

A probe 200A1 has a control unit 201, and an interface unit 202 for connecting to the network N1. The control unit 201 is a device for controlling the entire probe 200A1 and has a packet for communication quality measurement transmission/reception unit 201a, a signal relay processing unit 201b, a payload quality measurement control unit 201c, and a communication quality measurement result processing unit 201d as a configuration relating to the first embodiment.

The packet for communication quality measurement transmission/reception unit 201a transmits the packet for measuring communication quality transferred from the payload quality measurement control unit 201c to the reception-side probe via the interface unit 202. Moreover, the unit 201a receives the packet for measuring communication quality from the reception-side probe and transfers the packet to the payload quality measurement quality unit 201c.

The signal relay processing unit 201b of the transmission-side probe transmits an INVITE signal or a BYE signal received from the management server 100A1 that is a high-order apparatus of its own apparatus of the 201b to the reception-side probe. The signal relay processing unit 201b of the transmission-side probe transmits a "200OK" signal that is a response result of the signal received from the reception-side probe to the management server 100A1 after processing by the communication quality measurement result processing unit 201d.

The signal relay processing unit 201b of the reception-side probe transmits an INVITE signal or a BYE signal received from the transmission-side probe to the management server 100B1 that is a high-order apparatus of its own apparatus of the unit 201b. The unit 201b of the reception-side probe transmits "200OK" signal that is a result response of the signal from the management server 100B1 to the transmission-side probe.

A payload quality measurement control unit 201c of the transmission-side probe transmits a notification of starting communication quality measurement to the management server 100A1 that is a high-order apparatus of its own apparatus of the unit 201c. When the unit 201c of the transmission-side probe receives the notification from the management server 100A1, the unit 201c transmits a packet for measuring communication quality to the reception-side probe via a packet for communication quality measurement transmission/reception unit 201a.

When the packet for measuring communication quality received from the reception-side probe is transferred from packet for communication quality measurement transmission/reception unit 201a to the payload quality measurement control unit 201c of the transmission-side probe, the unit 201c transmits a notification of completion of communication quality measurement to the management server 100A1 that is a higher-order apparatus of its own apparatus of the unit 201c after processing by the communication quality measurement result processing unit 201d.

When the packet for measuring communication quality received from the transmission-side probe is transferred from the packet for communication quality measurement transmission/reception unit 201a to the payload quality measurement control unit 201c of the reception-side probe, the unit 201c transmits a notification of reception of the packet for measuring communication quality to the management server 100B1 that is a higher-order apparatus of its own apparatus of the unit 201c.

When the payload quality measurement control unit 201c of the reception-side probe receives a notification of reception response to a packet for measuring communication quality from the management server 100B1 that is a high-order apparatus of its own apparatus of the unit 201c, the unit 201c transmits a packet for measuring communication quality to the transmission-side probe via the packet for communication quality measurement transmission/reception unit 201a.

When an own apparatus of the communication quality measurement result processing unit 201d is a transmission-side probe and the signal relay processing unit 201b receives "200OK" signal that is a result of response to a signal transmitted from the reception-side probe, the unit 201d processes the result of quality measurement for the signal based on the result of response to the signal.

When an own apparatus of the communication quality measurement result processing unit 201d is a transmission-side probe, and the unit 201d receives a packet for measuring communication quality transmitted from the reception-side probe, the 201d processes the result of quality measurement for the payload of the packet for measuring communication quality.

Next, a processing of communication quality measurement test of a first embodiment will be described. FIGS. 3A and 3B form a sequence diagram illustrating a processing of a communication quality measurement test. The communication quality measurement test here is, for example, an audio test. It is assumed in FIGS. 3A and 3B that a probe 200A1 that is under control of a management server 100A1 is a transmission-side probe, and a probe 200B1 that is under control of a management server 100B1 is a reception-side probe, and the probe 200A1 and the probe 200B1 are opposing probes.

First, a payload quality measurement control unit 201c of the probe 200A1 transmits a notification of starting communication quality measurement to the signal quality measurement control unit 101b of the management server 100A1 (Step S101).

Subsequently, when the signal quality measurement control unit 101b of the management server 100A1 receives the notification of starting communication quality measurement, the unit 101b transfers an "Invite" signal to the signal transmission/reception unit 101a of the management server 100A1 (Step S102).

When the "INVITE" signal is transferred to the signal transmission/reception unit 101a of the management server 100A1, the unit 101a transmits the "INVITE" signal to signal relay processing unit 201b of the probe 200A1 (Step S103).

When the signal relay processing unit 201b of the probe 200A1 receives the "INVITE" signal, the unit 201b transmits the "INVITE" signal to a signal relay processing unit 201b of the probe 200B1 (Step S104).

When the signal relay processing unit 201b of the probe 200B1 receives the "INVITE" signal, the unit 201b transmits the "INVITE" signal to a signal transmission/reception unit 101a of a management server 100B1 (Step S105).

Then, when the signal transmission/reception unit 101a receives the "INVITE" signal, the unit 101a of the management server 100B1 transfers the "INVITE" signal to the signal quality measurement control unit 101b of the management server 100B1 (Step S106).

When the "INVITE" signal is transferred to the signal quality measurement control unit 101b of the management server 100B1, the unit 101b transfers a "200OK" signal that is a response result to the "Invite" signal to the signal transmission/reception unit 101a of the management server 100B1 (Step S107).

When, the "200OK" signal is transferred to the signal transmission/reception unit 101a of the management server 100B1, the unit 101a transmits the "200OK" signal to the signal relay processing unit 201b of the probe 200B1 (Step S108).

When the signal relay processing unit 201b of the probe 200B1 receives the "200OK" signal, the unit 201b of the probe 200B1 transmits the "200OK" signal to a signal relay processing unit 201b of the probe 200A1 (Step S109).

When the signal relay processing unit 201b of the probe 200A1 receives the "200OK" signal, the unit 201b transfers the reception result to the communication quality measurement result processing unit 201d of the probe 200A1. The unit 201d processes the result of signal quality measurement based on the reception result (Step S110).

The signal relay processing unit 201b of the probe 200A1 transmits the "200OK" signal to the signal transmission/reception unit 101a of the management server 100A1 (Step S1).

Then, the signal transmission/reception unit 101a of the management server 100A1 transfers the "200OK" signal to the signal quality measurement control unit 101b of the management server 100A1 (Step S112).

When the signal quality measurement control unit 101b of the management server 100A1 receives the "200OK" signal, the unit 101b transmits a notification of starting communication quality measurement to the payload quality measurement control unit 201c of the probe 200A1 (Step S113).

When the payload quality measurement control unit 201c of the probe 200A1 receives the notification of starting communication quality measurement, the unit 201c transfers the packet for measuring communication quality to the packet for communication quality measurement transmission/reception unit 201a of the probe 200A1 (Step S114).

Then, the packet for communication quality measurement transmission/reception unit 201a of the probe 200A1 transmits the transferred packet for measuring communication quality to the packet for communication quality measurement transmission/reception unit 201a of the probe 200B1 (Step S115).

Then the packet for communication quality measurement transmission/reception unit 201a of the probe 200B1 transfers the received packet for measuring communication quality to the payload quality measurement control unit 201c of the probe 200B1 (Step S116).

When the payload quality measurement control unit 201c of the probe 200B1 receives the packet for measuring communication quality, the unit 201c transmits a reception notification of the packet for measuring communication quality to the signal quality measurement control unit 101b of the management server 100B1 (Step S117).

The signal quality measurement control unit 101b of the management server 100B1 transmits a notification of reception response to the packet for measuring communication quality to the payload quality measurement control unit 201c of the probe 200B1 (Step S118).

When the payload quality measurement control unit 201c of the probe 200B1 receives the notification of reception response to a packet for measuring communication quality, the unit 201c transfers the packet for measuring communication quality to the packet for communication quality measurement transmission/reception unit 201a of the probe 200B1 (Step S119).

Then, the packet for communication quality measurement transmission/reception unit 201a of the probe 200B1 transmits the transferred packet for measuring communication quality to the packet for communication quality measurement transmission/reception unit 201a of the probe 200A1 (Step S120).

The packet for communication quality measurement transmission/reception unit 201a of the probe 200A1 transfers the received packet for measuring communication quality to the payload quality measurement control unit 201c of the probe 200A1 (Step S121).

When the packet for measuring communication quality is transferred to the payload quality measurement control unit 201c of the probe 200A1, the unit 201c transfers the reception result of the packet for measuring communication quality to a communication quality measurement result processing unit 201d of the probe 200A1. The unit 201d of the probe 200A1 processes the result of the payload quality measurement based on the reception result (Step S122).

The payload quality measurement control unit 201c of the probe 200A1 transmits a notification of completion of communication quality measurement to the signal quality measurement control unit 101b of the management server 100A1 (Step S123).

When the signal quality measurement control unit 101b of the management server 100A1 receives the notification of completion of communication quality measurement, the unit 101b transfers a "BYE" signal to the signal transmission/reception unit 101a of the management server 100A1 (Step S124).

Subsequently, the signal transmission/reception unit 101a of the management server 100A1 transmits the transferred "BYE" signal to the signal relay processing unit 201b of the probe 200A1 (Step S125).

The signal relay processing unit 201b of the probe 200A1 transmits the received "BYE" signal to the signal relay processing unit 201b of the probe 200B1 (Step S126).

Then, the signal relay processing unit 201b of the probe 200B1 transmits the received "BYE" signal to the signal transmission/reception unit 101a of the management server 100B1 (Step S127).

Subsequently, the signal transmission/reception unit 101a of the management server 100B1 transfers the received "BYE" signal to the signal quality measurement control unit 101b of the management server 100B1 (Step S128).

When the "BYE" signal is transferred to the signal quality measurement control unit 101b of the management server 100B1, the unit 101b transfers a "200OK" signal that is a result of response to the "BYE" signal to the signal transmission/reception unit 101a of the management server 100B1 (Step S129).

Subsequently, the signal transmission/reception unit 101a of the management server 100B1 transmits the transferred "200OK" signal to the signal relay processing unit 201b of the probe 200B1 (Step S130).

When the signal relay processing unit 201b of the probe 200B1 receives the "200OK" signal, the unit 201b transmits a "200OK" signal to the signal relay processing unit 201b of the probe 200A1 (Step S131).

When the signal relay processing unit 201b of the probe 200A1 receives the "200OK" signal, the unit 201b transfers the reception result to the communication quality measurement result processing unit 201d of the probe 200A1. Then, the unit 201d of the probe 200A1 processes the result of signal quality measurement based on the reception result (Step S132).

The signal relay processing unit 201b of the probe 200A1 transmits the "200OK" signal to the signal transmission/reception unit 101a of the management server 100A1 (Step S133).

Finally, the signal transmission/reception unit 101a of the management server 100A1 transfers the "200OK" signal to the signal quality measurement control unit 101b of the management server A1 (Step S134).

According to the above first embodiment, a management server controls a signal for executing a protocol stack that requires a high processing load, and probes or agents for measuring communication quality only control payload for executing a packet for measuring communication quality that requires a low processing load. Thus, the loads are distributed, and probes or agents for measuring communication quality may be located at every measurement base in a network. As a result, a point where a communication fault occurs may be identified immediately and precisely.

Now, a second embodiment will be explained. First, a system configuration of a communication quality measurement system of the second embodiment will be explained. FIG. 4 illustrates a configuration overview of a communication quality measurement system S2 of the second embodiment. Note that the following components shown in the FIG. 4 are basically the same as those components shown in the first embodiment: a communication quality measurement system S2, a management server 100A2, a probe 200A2, a HGW400A2 in which an agent A2 for measuring communication quality is implemented, a probe 200B2, a HGW400B2 in which an agent B2 for measuring communication quality is implemented, an agent A2, and an agent B2. In the second embodiment, the only difference from the first embodiment will be basically explained and the same configuration, functions, and processing will not be described.

First, referring to FIG. 4, in the communication quality measurement system S2 of the second embodiment, the management server 100A2 stores the following: protocol stacks (for example, for SIP (Session Initiation Protocol) (for VoIP (Voice over Internet Protocol)), SIP (for TVoIP (Television Voice over Internet)), contents delivery (CDS (Contents Delivery Service)), and a scenario file for communication quality measurement (for example, a scenario pattern (1), a scenario pattern (2), a scenario for isolating communication fault), and a scenario pattern (3) (for continuous test). A protocol stack and a scenario file for communication quality measurement may additionally be stored as required.

Prior to a communication quality measurement performed by opposing probes 200A2 and 200B2, the management server 100A2 generates a scenario file for executing communication quality measurement by combining the above stored protocol stacks and scenario files for communication quality measurement depending on the purpose of a test. Then, the management server 100A2 delivers the same scenario file for executing communication quality measurement to the opposing probes or agents among the probe 200A2, the probe 200B2, the agent A2, and agent B2.

The probe 200A2 and the probe 200B2 perform a communication quality measurement according to the received scenario file for executing communication quality measurement. In this case, the management server 100A2 executes the protocol stack and analyses the signal, and the probe 200A2 and the probe 200B2 relay a packet for measuring communication quality and performs communication quality measurement of a payload.

Figure 5:
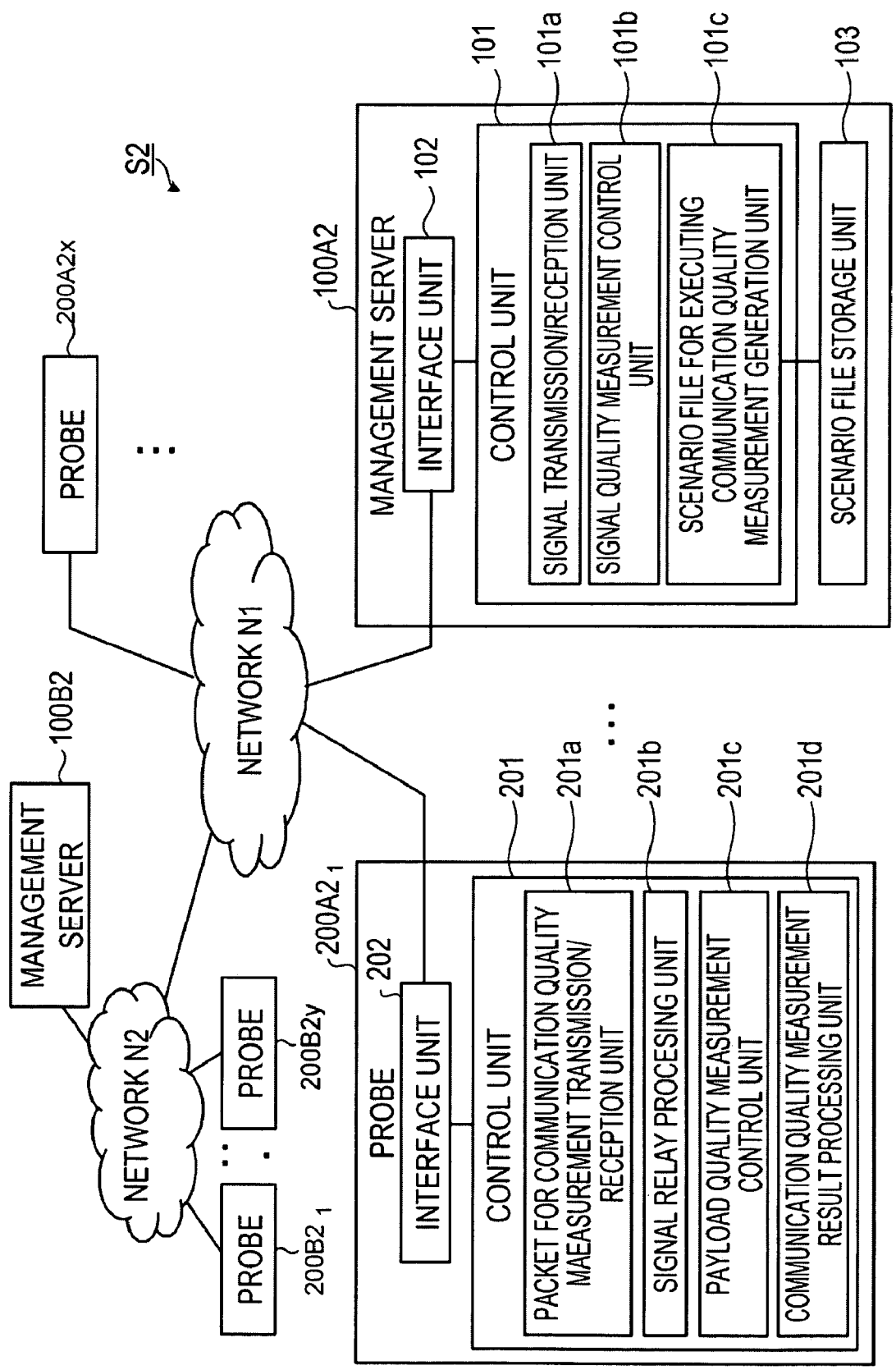
FIG. 5 is a block diagram illustrating a configuration of a communication quality measurement system of the second embodiment.

Next, the communication quality measurement system S2 of the second embodiment will be explained. FIG. 5 is a block diagram illustrating a configuration of a communication quality measurement system S2 of the second embodiment. The communication quality measurement system S2 of the second embodiment is configured by a management server 100A2 connected via a network N1, a probe $200A2_1$, ..., a probe $200A2_x$ (x>1) that are under control of the management server 100A2, and a management server 100B2 connected via a network N2 and a probe $200B2_1$, ..., $200B2_y$ (y>1) that are under control of the management server 100B2.

Note that configurations of the management server 100A2, and the management server 100B2 may be the same, and configurations of probe $200A2_1$, ..., probe $200A2_x$ (x>1), and probe $200B2_1$, ..., $200B2_y$ may be the same, respectively. The network N1 and the network N2 are connected to make one network.

The difference between the 100A2 and 100B2 and the management server 100A1 and the management server 100B1 of the first embodiment are that the control unit 101 further includes a scenario file for executing communication quality measurement generation unit 101c and a scenario file storage unit 103. Moreover, the scenario file for executing communication quality measurement generation unit 101c of the management server 100A2 and the management server 100B2 generate a scenario file for executing communication quality measurement from protocol stacks and/or scenario files for executing communication quality measurement stored in the scenario file storage unit 103, and distribute the generated files to the subordinate probes via the signal transmission/reception unit 101a.

The difference between probe $200A2_1$, ..., probe $200A2_x$, and probe $200B2_1$, ..., $200B2_y$ and those of the first embodiment, the probe $200A1_1$, ... $A1_x$, a probe $200B1_1$, ..., $200B_y$, is that a signal relay processing unit 201*b* temporarily stores a scenario file for executing communication quality measurement distributed from the management server 100A2 or 100B2 that is a high-order apparatus of its own apparatus of the units 201*b* and consecutively performs communication quality measurement between the signal relay processing unit 201*b* of opposing probes according to procedures defined in the scenario file for executing communication quality measurement.

Next, a processing of communication quality measurement test of the second embodiment will be described. FIGS. 6A and 6B form a sequence diagram illustrating a processing of a communication quality measurement test of the second embodiment. The communication quality measurement test here is, for example, an audio test. It is assumed in FIGS. 6A and 6B that a probe 200A2 that is under control of a management server 100A2 is a transmission-side probe, and a probe 200B2 that is under control of a management server 100B2 is a reception-side probe, and the probe 200A2 and the probe 200B2 are opposing probes.

First, a payload quality measurement control unit 201*c* of the probe 200A2 transmits a notification of starting communication quality measurement to the signal quality measurement control unit 101*b* of the management server 100A2 (Step S201).

Subsequently, when the signal quality measurement control unit 101*b* of the management server 100A2 receives the notification of starting communication quality measurement, the unit 101*b* transmits a scenario file for executing SIP (Session Initiation Protocol) to the signal relay processing unit 201*b* of the probe 200A2 (Step S202). Similarly, the signal quality measurement control unit 101*b* of the management server 100B2 transmits the same scenario file for executing SIP connection as that transmitted at Step S202 to the signal relay processing unit 201*b* of the probe 200B2 (Step S203).

Subsequently, according to procedures defined in the received scenario file, the signal relay processing unit 201*b* of the probe 200A2 transmits an "INVITE" signal to the signal relay processing unit 201*b* of the probe 200B2 (Step S204), and receives a "200OK" signal that is a response result to the "INVITE" signal from the signal relay processing unit 201*b* of the probe 200B2 (Step S205). These processing of Step S204 and Step S205 are execution of a scenario for a protocol stack.

Subsequently, the signal relay processing unit 201*b* of the probe 200A2 transmits the scenario execution result for performing SIP connection (Step S206). Moreover, the signal relay processing unit 201*b* of the probe 200B2 transmits the scenario execution result for performing SIP connection to the signal quality measurement control unit 101*b* of the management server 100B2 (Step S207).

When the signal quality measurement control unit 101*b* of the management server 100A2 receives the scenario execution result, the unit 101*b* transmits a scenario file (a scenario related to execution of a packet for measuring communication quality) to the payload quality measurement control unit 201*c* of the probe 200A2 (Step S208). Similarly, when the signal quality measurement control unit 101*b* of the management server 100B2 receives the scenario execution result, the unit 101*b* transmits the same scenario file (a scenario related to a packet for measuring communication quality) as that sent at Step S208 to the payload quality measurement control unit 201*c* of the probe 200B2 (Step S209).

Then, according to the procedures define in the received scenario file, the payload quality measurement control unit 201*c* of the probe 200A2 transfers a packet for measuring communication quality to the packet for communication quality measurement transmission/reception unit 201*a* of the probe 200A2 (Step S210).

Then, the packet for communication quality measurement transmission/reception unit 201*a* of the probe 200A2 transmits the transferred packet for measuring communication quality to the packet for communication quality measurement transmission/reception unit 201*a* of the probe 200B2 (Step S211).

Subsequently, the packet for communication quality measurement transmission/reception unit 201*a* of the probe 200B2 transfers the received packet for measuring communication quality to the payload quality measurement control unit 201*c* of the probe 200B2 (Step S212).

Then, in response to the received packet for measuring communication quality, the payload quality measurement control unit 201*c* of the probe 200B2 transfers the packet to the packet for communication quality measurement transmission/reception unit 201*a* of the probe 200B2 (Step S213).

Then, the packet for communication quality measurement transmission/reception unit 201*a* of the probe 200B2 transmits the transferred packet for measuring communication quality to the packet for communication quality measurement transmission/reception unit 201*a* of the probe 200A2 (Step S214).

The packet for communication quality measurement transmission/reception unit 201*a* of the probe 200A2 transfers the received packet for measuring communication quality to the payload quality measurement control unit 201*c* of the probe 200A2 (Step S215). These processing of Step S210 to Step S215 are execution of a scenario for a packet for measuring communication quality.

Then, the payload quality measurement control unit 201*c* of the probe 200A2 transmits the scenario execution result to the signal quality measurement control unit 101*b* of the management server 100A2 (Step S216). Similarly, the payload quality measurement control unit 201*c* of the probe 200B2 transmits the scenario execution result of a packet for measuring communication quality to the signal quality measurement control unit 101*b* of the management server 100B2 (Step S217).

When the signal quality measurement control unit 101*b* of the management server 100A2 receives a notification of starting communication quality measurement, the unit 101*b* transmits a scenario file for executing cancellation of SIP to the signal relay processing unit 201*b* of the probe 200A2 (Step S218). Similarly, the signal quality measurement control unit 101*b* of the management server 100B2 transmits the same scenario file for executing cancellation of SIP connection as that transmitted at Step S218 to the signal relay processing unit 201*b* of the probe 200B2 (Step S219).

Subsequently, according to the procedures defined in the received scenario, the signal relay processing unit 201*b* of the probe 200A2 transmits a "BYE" signal to the signal relay processing unit 201*b* of the probe 200B2 (Step S220) and receives a "200OK" signal that is a result of response to the "BYE" signal from the signal relay processing unit 201*b* of the probe 200B2 (Step S221). These processing of Step S220 and Step S221 are execution of a scenario for a protocol stack.

Finally, the signal relay processing unit 201*b* of the probe 200A2 transmits the scenario execution result for cancelling SIP connection to the signal quality measurement control unit 101*b* of the management server 100A2 (Step S222). Similarly, the signal relay processing unit 201*b* of the probe 200B2 transmits the scenario execution result for cancelling the SIP connection to the signal quality measurement control unit 101*b* of the management server 100B2 (Step S223).

Now, communication quality measurement scenarios managed by the management server 100A2 is explained. The communication quality measurement scenarios include two kinds of scenarios: a scenario related to execution of a protocol stack, and a scenario related to execution of a packet for measuring communication quality. When a communication quality measurement scenario is executed, the management server 100A2 creates the scenario. If the scenario is for audio quality by a SIP connection, the following scenarios are created: a scenario for executing a protocol stack (SIP connection), a scenario for transmitting a packet for communication quality measurement, and a scenario for executing a protocol stack (SIP connection cancellation). These scenarios are sequentially delivered to a transmission-side probe and a reception-side probe by the notification of transmission probe.

As shown in FIG. 7, a scenario related to execution of a protocol stack includes the following as items related to execution of a protocol stack: a transmission-side probe or a reception-side probe (identification information whether it is a transmission-side probe or a reception-side probe), information on transmission destination (opposite probe information)(probe name, IP address of the probe), transmission message information 1 (content of transmission message), response message information 1 to the transmission message information 1 (content of reception response message), transmission message information 2 (content of transmission message), response message information 2 to the transmission message information 2 (content of reception response message), and response message information (final) that is the last response message (content of reception response message).

When executing a scenario related to execution of a protocol stack, if an own apparatus is a transmission-side probe, the transmission-side probe reads the content of transmission message from the scenario, and transmits the message to the opposite probe. Depending on the content of the response message from the opposite probe, the transmission-side probe sequentially transmits messages that should be transmitted, and when the transmission-side probe receives the last response message, judges the processing is completed and notifies the completion to the management server. When the reception-side probe receives a transmission message described in the scenario file, transmits the next response message and after transmitting the last response message, notifies the completion to the management server.

As shown in FIG. 8, a scenario related to execution of a packet for measuring communication quality includes the following as items related to execution of a packet for measuring communication quality: information on transmission destination (opposite probe information)(probe name, IP address of the probe), a transmission-side probe or a reception-side probe (identification information on whether it is a transmission-side probe or a reception-side probe), the number of transmitting packets for measuring communication quality, the size of transmitting packets for measuring communication quality, CODEC ('compressor-decompressor' or, 'coder-decoder') type, and transmission intervals of packets for measuring communication quality.

When executing a scenario related to execution of a packet for measuring communication quality, if an own apparatus is a transmission-side probe, the transmission-side probe transmits a packet for measuring communication quality to the opposite probe according to the following items described in the scenario related to execution of a packet for measuring communication quality: a type of scenario settings, a transmission size of a packet for measuring communication quality, transmission intervals for a packet for measuring communication quality, and the number of transmitting packets for measuring communication quality. Upon completing execution of the scenario for the packet for measuring communication quality, a completion notification is transmitted to the management server. The reception-side probe sequentially transmits responses to packets for measuring quality received from the transmission-side probe to the transmission-side probe, and transmits the completion notice to the management server after transmitting responses as many as the number of executions.

According to the scenario related to execution of a packet for measuring communication quality, packets for measuring communication quality may be sequentially transmitted by specifying a number of transmissions in the scenario. Moreover, the management server 100A2 may create a series of scenarios related to executing packets for communication measurement for SIP connection, transmitting packets for measuring communication quality, and cancelling SIP connection.

According to the second embodiment, procedures for measuring communication quality may be combined as a scenario and collectively transmitted to probes or agents for measuring communication quality even when complicated communication quality measurement procedures are required that include a plurality of protocol stacks and/or scenarios for measuring communication quality to identify a place where a communication fault occurs. This enables to prevent items for communication quality measurement from being missed, and to identify the place where communication fault occurs immediately and precisely. Moreover, by using a scenario for executing communication quality measurement, the measurement is performed according to the scenario between signal relay processing units 201b of probes or agents. As a result, an easy and reliable communication quality is achieved when measuring communication quality of a protocol that requires real-time processing.

Conventionally, delivering an update program to a large numbers of probes installed in a network is required, if new items related to execution of a protocol stack, or to execution of a packet for measuring communication quality are newly added. However, according to the second embodiment, only items related to execution of a protocol stack or execution of a packet for measuring communication quality may be added in the management server. Thus, serviceability and scalability of scenarios related to execution of a protocol stack or execution of a packet for measuring communication quality are improved.

Now, a third embodiment will be explained. In the third embodiment, a communication fault is isolated when it occurs in a communication quality measurement system. FIG. 9 illustrates an overview of isolating communication fault at the occurrence in a communication quality measurement system of the third embodiment. Note that the following components shown in the FIG. 9 are basically the same as those components shown in the first embodiment and the second embodiment: a communication quality measurement system S3, a management server 100A3, a probe 200A3, a HGW400A3, and a probe 200B3, a HGW400B3, an agent A3 and an agent B3. In the third embodiment, only the difference from the first embodiment and the second embodiment will be explained. The same configuration, functions, and processing will not be described.

First, referring to FIG. 9, when a communication fault occurs between the opposing probes, (11) first, a management server 100A3 delivers a scenario to an agent A3, (12) then, a communication quality is measured according to the scenario between the agent A3 and the agent B3.

(13) At this time, a communication fault (for example, a communication delay) is detected between the agent A3 and the agent B3. Then, the management server 100A3 delivers a scenario for identifying a point where communication fault occurs to the agent A3. (14) A communication quality measurement is performed according to the scenario between the agent A3 and the probe 200A3, and between the agent A3 and the probe 200B3.

Moreover, delivering the same scenarios to probes or agents installed between these probes and the agents (or probes) enables to gradually narrowing down where the communication fault occurs, thereby enabling to identify the point where the fault occurs. The management server 100A3 may generate a scenario file for identifying a point where a communication fault occurs.

Next, isolating a communication fault at the occurrence will be explained. FIG. 10 is a flow chart illustrating isolating a communication fault at the occurrence in the third embodiment. As shown in FIG. 10, first, a management server 100A3 transmits a communication quality measurement scenario (communication quality measurement scenario between the agent A3 and the agent B3) to the agent A3 (Step S301).

Subsequently, the agent A3 executes a communication quality measurement scenario for the agent B3, and a communication quality is measured (Step S302). Then, the management server 100A3 judges whether or not a communication fault is detected between the agent A3 and the agent B3 (Step S303). If it is judged that a communication fault is detected between the agent A3 and the agent B3 (Step S303: Yes), then the processing proceeds to the step S304. If it is judged that no communication fault is detected between the agent A3 and the agent B3 (Step S303: No), then the processing for isolating communication fault at the occurrence ends.

In Step S304, the management server 100A3 transmits a communication quality measurement scenario for identifying the point where communication fault occurs to the agent A3. Subsequently, the agent A3 executes the scenario for a probe 200A3, and a probe 200B3 (Step S305). Then, the agent A3 identifies a point where communication fault occurs based on the result of execution of communication quality measurement scenario (Step S306).

According to the above third embodiment, if an occurrence of communication fault is detected between a probe and an agent, a communication quality measurement scenario for identifying the point where communication fault occurs is generated, and the scenario is distributed to probes and agents that exist between the probe and the agent that detect the communication fault. Then, the probes and agents that receive the scenario measure communication quality. Thus, an area where the communication fault may have occurred may be gradually narrowed down, and finally the point where the fault occurs may be precisely identified.

Although the embodiments of the present invention have been described, it should be understood that the various changes, substitutions, and alterations could be made hereto without departing from the spirit and scope of the invention. The effects of the invention are not limited to those described in the embodiments.

Among each processing described in the above embodiment, an entire processing or a part of processing that are explained as automatic processing may be performed manually, or those processing that are explained as manual processing may be performed automatically by applying a known method. Moreover, processing procedures, control procedures, specific names, and information that includes various data or parameters may be optionally changed unless otherwise specified.

Components of each of the devices illustrated in the figures include functional concepts, and are not necessarily physically configured as illustrated. This means specific embodiments of distribution and integration of each of devices are not limited to those illustrated in the figures and a whole or a part of the embodiments may be physically distributed or integrated in a given unit depending on various loads or status of use.

An entire or a part of each of processing functions performed by each device may be achieved by a CPU (Central Processing Unit) (or a MPU (Micro Processing Unit)), a MCU (Micro Controller Unit) and a program analyzed and executed by the CPU (or a micro computer such as a MPU and a MCU), or hardware by a wired logic.

Particularly, processing loads of a probe $200A1_1, \ldots, 200A1_x, 200B1_1,$ and, $\ldots,$ a probe $200B1_y$ are light, because the probes do not control protocol stacks. Therefore, a processing capability of a control device of the existing communication device may not be substantially affected even if functions of a probe are implemented as an agent program in the existing communication device. Thus, communication quality measurement devices may be installed in a lot of bases within a network inexpensively and easily.

According to the above disclosed communication quality measurement system, communication quality measurement device, management server and method thereof, the management server controls signal and measures communication quality based on the result of signal control, and the communication quality measurement device controls payload and measures communication quality of the payload based on the payload control. Therefore, the load is distributed; particularly a load to the communication quality measurement device may be reduced and inexpensive configuration is achieved.

Moreover, the signal control unit transmits a signal to the communication quality measurement device in response to a notification of starting communication quality measurement transmitted from a notification of starting communication quality measurement transmission unit. In this way, the management server performs signal control that has a large load. Thus the load is distributed. As a result, load to the communication quality measurement device is reduced to achieve inexpensive and compact configuration. Moreover, the communication quality measurement device may perform communication quality measurement without being delivered the latest protocol stack or a test program.

The communication quality measurement device relays a signal received from the signal control unit to opposing communication quality measurement device, and relays the response result of the signal received from the opposing communication quality measurement device to the signal control unit. Therefore, the communication quality measurement device performs only a signal relay among a signal control that has a high load, a load to the device may be reduced to achieve inexpensive and compact configuration. Moreover, the communication quality measurement device may perform communication quality measurement without being delivered the latest protocol stack or a test program.

Moreover, a management server transmits communication quality measurement scenario, in which a plurality of procedures for communication measurement are predefined, and/or protocol stack to all of controlling communication quality measurement devices prior to a communication quality measurement. This enables automatically executing communication quality measurement with a complicated pattern by the received communication quality measurement scenario and/or protocol stack.

Furthermore, functions of communication quality measurement may be simplified; therefore, the functions may be easily installed as an agent in all kinds of electronic devices that can communicate.

What is claimed is:

1. A communication quality measurement system comprising: a management server that comprises: a protocol control signal quality measurement controller configured to generate and control a protocol control signal that executes a protocol, the protocol being used for communicating a test packet between a first communication duality measurement device and a second communication duality measurement device; and a protocol control signal transceiver configured to transmit the protocol control signal to the first communication quality measurement device and receive the protocol control signal from the first communication quality measurement device; and the first communication quality measurement device that comprises: a signal relay processor configured to relay the protocol control signal between the management server and the second communication quality measurement device; a packet transceiver configured to transmit and receive the test packet for communication quality measurement; and a payload quality measurement control controller configured to measure quality of a payload of the test packet received from the second communication quality measurement device.

2. The communication quality measurement system according to claim 1, wherein
the payload quality measurement controller is further configured to send a notification of starting communication quality measurement to the management server, and
the protocol control signal quality measurement controller is further configured to generate and transmit a protocol control signal in response to the notification of starting communication quality measurement.

3. The communication quality measurement system according to claim 1, wherein the management server further includes:
a communication quality measurement scenario generator configured to generate a communication quality measurement scenario defining procedures for a plurality of communication quality measurements and/or a protocol stack;
a communication quality measurement scenario transmitter configured to transmit the communication quality measurement scenario or a protocol stack generated by the communication quality measurement scenario generator to the second communication quality measurement device prior to a communication quality measurement, wherein the second communication quality measurement device further includes:
a communication quality measurement scenario executor configured to sequentially execute communication quality measurements with a given interval according to the communication quality measurement scenario or the protocol stack received from the management server; and
a scenario execution result transmitter configured to transmit a result of the communication quality measurement performed according to the communication quality measurement scenario by the communication quality measurement scenario executor to the management server.

4. A communication quality measurement method comprising:
a management server:
generating and controlling a protocol control signal that executes a protocol, the protocol being used for communicating a test packet between a first communication quality measurement device and a second communication quality measurement device; and
transmitting the protocol control signal to the first communication quality measurement device and receiving the protocol control signal from the first communication quality measurement device; and
the first communication quality measurement device:
relaying the protocol control signal between the management server and the second communication quality measurement device;
transmitting the test packet to the second communication quality measurement device and receiving the test packet from the second communication quality measurement device; and
measuring quality of a payload of the test packet received from the second communication quality measurement device.

* * * * *